United States Patent [19]
Chin et al.

[11] Patent Number: 6,160,562
[45] Date of Patent: Dec. 12, 2000

[54] SYSTEM AND METHOD FOR ALIGNING AN INITIAL CACHE LINE OF DATA READ FROM LOCAL MEMORY BY AN INPUT/OUTPUT DEVICE

[75] Inventors: Kenneth T. Chin, Cypress, Tex.; Clarence K. Coffee, Pembroke Pines, Fla.; Michael J. Collins, Tomball, Tex.; Jerome J. Johnson; Phillip M. Jones, both of Spring, Tex.; Robert A. Lester, Houston, Tex.; Gary J. Piccirillo, Cypress, Tex.

[73] Assignee: Compaq Computer Corporation, Houston, Tex.

[21] Appl. No.: 09/135,620

[22] Filed: Aug. 18, 1998

[51] Int. Cl.[7] ............................................. G06F 13/14
[52] U.S. Cl. .......................... 345/520; 345/521; 710/128; 710/129; 711/3
[58] Field of Search ...................... 345/520, 521, 345/515, 516; 711/3, 127, 118; 710/126–129, 3, 35

[56] References Cited

U.S. PATENT DOCUMENTS

| | | | |
|---|---|---|---|
| 5,636,354 | 6/1997 | Lear | 711/3 |
| 5,793,693 | 8/1998 | Collins et al. | 365/230.01 |
| 5,915,126 | 6/1999 | Maule et al. | 711/127 |

*Primary Examiner*—Kee M. Tung
*Attorney, Agent, or Firm*—Kevin L. Daffer; Conley, Rose & Tayon

[57] ABSTRACT

A computer is provided having a bus interface unit coupled between a CPU bus, a PCI bus and/or a graphics bus. The bus interface unit includes controllers linked to the respective buses and further includes a plurality of queues placed within address and data paths linking the various controllers. An interface controller coupled between a peripheral bus (excluding the CPU local bus) determines if an address forwarded from a peripheral device is the first address within a sequence of addresses used to select a set of quad words constituting a cache line. If that address (i.e., target address) is not the first address (i.e., initial address) in that sequence, then the target address is modified so that it becomes the initial address in that sequence. An offset between the target address and the modified address is denoted as a count value. The initial address aligns the reads to a cacheline boundary and stores in successive order the quad words of the cacheline in the queue of the bus interface unit. Quad words arriving in the queue prior to a quad word attributed to the target address are discarded. This ensures the interface controller, and eventually the peripheral device, will read quad words in successive address order, and all subsequently read quad words will also be sent in successive order until the peripheral read transaction is complete.

18 Claims, 5 Drawing Sheets

SYSTEM AND METHOD FOR ALIGNING AN INITIAL CACHE LINE OF DATA READ FROM LOCAL MEMORY BY AN INPUT/OUTPUT DEVICE

BACKGROUND OF THE INVENTION

1. Field of the Invention

This invention relates to a computer and, more particularly, to a bus interface unit which allows a peripheral device to read data from a local memory in sequential address order by rearranging bits within the initial address forwarded to the local memory and de-queuing data until an initial target data is aligned for transfer to the peripheral device. Subsequent transfer cycles occur in address order to complete a cache line, and subsequent cache lines are transferred at cache line boundaries until the entire transfer operation is complete.

2. Description of the Related Art

Modern computers are called upon to execute instructions and transfer data at increasingly higher rates. Many computers employ CPUs which operate at clocking rates exceeding several hundred MHz, and further have multiple buses connected between the CPUs and numerous input/output devices. The buses may have dissimilar protocols depending on which devices they link. For example, a CPU local bus connected directly to the CPU preferably transfers data at a faster rate than a peripheral bus connected to slower input/output devices. A mezzanine bus may be used to connect devices arranged between the CPU local bus and the peripheral bus. The peripheral bus can be classified as, for example, an industry standard architecture ("ISA") bus, an enhanced ISA ("EISA") bus or a microchannel bus. The mezzanine bus can be classified as, for example, a peripheral component interconnect ("PCI") bus to which higher speed input/output devices can be connected.

Coupled between the various buses are bus interface units. According to somewhat known terminology, the bus interface unit coupled between the CPU bus and the PCI bus is often termed the "north bridge". Similarly, the bus interface unit between the PCI bus and the peripheral bus is often termed the "south bridge".

The north bridge, henceforth termed a bus interface unit, serves to link specific buses within the hierarchical bus architecture. Preferably, the bus interface unit couples data, address and control signals forwarded between the CPU local bus, the PCI bus and the memory bus. Accordingly, the bus interface unit may include various buffers and/or controllers situated at the interface of each bus linked by the interface unit. In addition, the bus interface unit may receive data from a dedicated graphics bus, and therefore may include an advanced graphics port ("AGP") and/or a graphic component interface ("GCI") at the interface to that bus.

Mastership of the various buses is preferably orchestrated by an arbiter within the bus interface unit. For example, if a peripheral input/output device coupled to the PCI bus or a dedicated graphics bus wishes to read data from local memory, it must solicit mastership of the PCI or graphics bus before doing so. Once mastership is granted, the peripheral device can then read the appropriate data from the local or system memory to temporary storage devices or "queues" within the bus interface unit.

Typically, data is arranged within the system memory according to cache lines. A read operation from system memory to the peripheral device of a cache line generally involves several clock cycles. For example, a cache line may contain four quad words and each read cycle can transfer one quad word or eight bytes across a 64-bit memory bus.

A particular byte within the cache line can therefore be addressed by several bits. The least significant three bits can be used to determine a particular offset within each quad word, and the next two least significant bits are used to determine which quad word is being addressed within the cache line.

In many instances in which a peripheral device requests data from system memory, the first address dispatched to the memory controller designates either the first, second, third or fourth quad word within a particular cache line. Thus, it is said that the initial address is not constrained to a cache line boundary. Unless a particular addressing mode is used to extract quad words from a cache line, the memory controller will typically dispatch quad words according to the well known "toggle mode".

Toggle mode addressing of a cache line is generally known as the standard mechanism by which a microprocessor will extract data. Generally speaking, the order by which data is read from system memory depends on which quad word is first addressed. The first-addressed quad word is often referred to as the "target" quad word. Toggle mode addressing can be thought of as dividing a cache line in half, wherein the next successive quad word is dependent on where in the cache line the target quad word resides. For example, if the target quad word resides at hexadecimal address location 08 (or 01000 binary), then the target quad word will be read first, followed by quad word at address 00 to complete the ordering of the first half of the cache line being read. The second half of the cache line is read identical to the first half. That is, the quad word at hexadecimal address location 18 will be read before address location 10.

The mechanism of toggle mode addressing from an initial target address until the entire cache line is transferred is generally well known as a conventional microprocessor addressing. Unfortunately, a peripheral device connected to the PCI bus or the AGP/GCI graphics bus wants bursts of data in sequential addressing order (i.e., data which reside at addresses having numerically increasing values). In particular, a peripheral device generally reads data beginning at a target address and thereafter desires a quad word addressed by a next successive address location. For example, a peripheral device requires that the data be read to that device beginning with the least significant 5 bit address (e.g., hexadecimal 00, then 08, then 10, and then 18). Once the initial cache line has been read by the peripheral device, the next successive address generally aligns at the cache line boundary so that all subsequent quad words are addressed in proper sequential order. However, the target address for the first cache line to be read by the peripheral device must somehow be modified so that a sequential order of quad words can be sent to the peripheral device rather than quad words sent in toggle mode.

It would therefore be beneficial to derive a bus interface unit which can modify the target address to that of an initial address used to read the first (lowest addressable) quad word within a sequence of quad words forming the cache line. By modifying the addressing seen by the memory controller, the initial cache line is extracted in an order conducive to a peripheral device reading that cache line. However, quad words sent to the peripheral device before the target-address quad words must somehow be kept track of and properly discarded.

SUMMARY OF THE INVENTION

Broadly speaking, the present invention contemplates a computer and/or a bus interface unit. The bus interface unit is configured as a north bridge between a CPU local bus, a PCI bus a graphics bus and a memory bus. The CPU bus can link at least one and possibly more CPUs and associated cache storage locations within those CPUs. Additionally, the memory bus links a memory controller within the bus interface unit to system memory denoted as semiconductor memory. Examples of suitable system memory include, for example, DRAM or synchronous DRAM (SDRAM). If the graphics bus is an AGP/PCI bus, then a link may exist to the bus interface unit by the AGP interface to effectuate, e.g., 66 MHz 1× AGP transfers or 133 MHz 2× AGP data transfers. The bus interface unit maintains a PCI interface which is synchronous to the CPU interface and supports PCI burst cycles.

The bus interface unit is particularly suited to rearrange or modify a target address sent from a peripheral device (non CPU) to system memory. An interface controller within the bus interface unit is coupled between the bus on which the peripheral device resides and the various queues also within the bus interface unit. The interface controller receives the target address and modifies select bits within that address. Modifying those bits not only changes the target address to another address (i.e., an "initial address") but also ensures that the initial address is the first addressable location (lowest order address location) of the particular cache line selected for reading by the peripheral device. Accordingly, the interface controller contains logic which modifies those select bits. Assuming the cache line contains four quad words, the logic modifies the fourth and fifth least significant bit within the target address—i.e., bit 3 and 4 of a 32 bit address beginning with bit0 of ADDR[31:0]. Those bits are set to hexadecimal 00 so that the initial address will always be the least significant address within the cache line requested.

The interface controller may also contain a counter which keeps track of an offset between the target address and the initial address (i.e., 00 address) modified from the target address. The counter may set a flag or status bit sent possibly with the initial address. The status bit may denote that the initial address will select a quad word preceding the targeted quad word by the count value. For example, if the targeted quad word is the third quad word within a cache line, the count value from the quad word initially transmitted (i.e., initially addressed quad word) and the targeted quad word (i.e., target addressed quad word) will be two. That count value will signify that the queue within the bus interface unit which sequentially stores quad words from system memory must de-queue the first two quad words before arriving at the targeted quad word. This ensures that the targeted quad word will be received by the peripheral device as initially requested. More importantly, quad words which are subsequently sent after the targeted quad word will arrive in a sequentially increasing order recognizable by the peripheral device. All subsequent cache lines will be read with the least significant hexadecimal address 00, then 08, then 10 and then 18 since the first (targeted) address sent from the bus interface unit to the memory controller will always be 00. Even though the memory controller addresses in toggle mode, an initial 00 address will ensure data will be extracted in sequential order recognizable to the peripheral device as the data wrap mode.

In instances where the interface controller becomes starved for data, yet the peripheral device continues to request data through a read transaction, the interface controller will transmit a disconnect signal to the master peripheral device. The disconnect signal will naturally occur at cache line boundaries since the interface controller bursts entire cache lines. The disconnect signal will cause a temporary halt in the peripheral device read transaction. The peripheral device must arbitrate for mastership of the peripheral bus before the read transaction can be resumed. By asserting the disconnect signal when the interface controller operates as a peripheral bus slave, it can be assured that the next read cycle will fetch data from system memory beginning at the lowest address of the next successive cache line.

Broadly speaking, the present invention contemplates a computer. The computer includes a memory adapted to store a plurality of quad words arranged within a cache line. An output device coupled to a peripheral bus is adapted to read a target quad word within the cache line during an initial read cycle of a read transaction. The target quad word may correspond to an address which is not the first (lowest) address of quad words within the cache line. For example, the target quad word may correspond to the second, third or fourth address within a successive order of addresses used to select a portion of the cache line. A bus interface unit is further provided between the output device and the memory. The bus interface unit serves to fetch the plurality of quad words in a successive address order beginning with the lowest address and ending with the highest address of quad words within the cache line. Moreover, the bus interface unit discards all is quad words addressed prior to the target quad word. In this fashion, the bus interface unit ensures the quad words are drawn from memory in successive address order suitable for the output device reading successive data within the cache line and successive cache lines in a wrap mode addressing scheme. Furthermore, fetching the quad words in successive address order ensures the output device does not receive the cache line in toggle mode. It is known that graphics and PCI output devices require data in wrap mode and not toggle mode.

The present invention further contemplates an interface controller embodied within the bus interface unit. The interface controller is connected to the peripheral bus for receiving a target address from the output device. The target address corresponds to one of the plurality of quad words. The interface controller preferably includes logic for modifying the target address received from the output device to an initial address within a sequential order of addresses used to first select an initial quad word within the cache can be assured that the next read cycle will fetch data from system memory beginning at the lowest address of the next successive cache line.

Broadly speaking, the present invention contemplates a computer. The computer includes a memory adapted to store a plurality of quad words arranged within a cache line. An output device coupled to a peripheral bus is adapted to read a target quad word within the cache line during an initial read cycle of a read transaction. The target quad word may correspond to an address which is not the first (lowest) address of quad words within the cache line. For example, the target quad word may correspond to the second, third or fourth address within a successive order of addresses used to select a portion of the cache line. A bus interface unit is further provided between the output device and the memory. The bus interface unit serves to fetch the plurality of quad words in a successive address order beginning with the lowest address and ending with the highest address of quad words within the cache line. Moreover, the bus interface unit discards all quad words addressed prior to the target quad word. In this fashion, the bus interface unit ensures the quad words are drawn from memory in successive address order suitable for the output device reading successive data within the cache line and successive cache lines in a wrap mode addressing scheme. Furthermore, fetching the quad words in successive address order ensures the output device does not receive the cache line in toggle mode. It is known that graphics and PCI output devices require data in wrap mode and not toggle mode.

The present invention further contemplates an interface controller embodied within the bus interface unit. The interface controller is connected to the peripheral bus for receiving a target address from the output device. The target address corresponds to one of the plurality of quad words. The interface controller preferably includes logic for modifying the target address received from the output device to an initial address within a sequential order of addresses used to first select an initial quad word within the cache line. Thus, instead of first receiving a target word corresponding to the target address, the logic modifies the target address so that an initial quad word within the successive order of quad words is sent instead. A data queue is coupled to receive the initial quad word and discard the initial quad word and any quad words within the plurality of quad words prior to the quad word addressed by the target address, before sending the quad words to the peripheral bus. Thus, a combination of the interface controller, logic and data queue ensures quad words are sent to the output device in successive addressing order, and all quad words prior to the desired target quad words are discarded within the data queue.

The present invention further contemplates a method for reading quad words within a memory. The method includes presenting a target address from an output device to the memory. Thereafter, the target address is reordered or modified to an initial address within a sequence of addresses used to access in successive order a plurality of quad words within a cache line stored within the memory. The cache line is presented to a queue beginning with a quad word addressed by the initial address. Quad words are de-queued one quad word at a time while the initial address and requests are sent to the memory controller. De-queuing the queue in address sequential order, one quad word at a time, occurs until a cache line is removed from the queue.

BRIEF DESCRIPTION OF THE DRAWINGS

Other objects and advantages of the invention will become apparent upon reading the following detailed description and upon reference to the accompanying drawings in which.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 1:
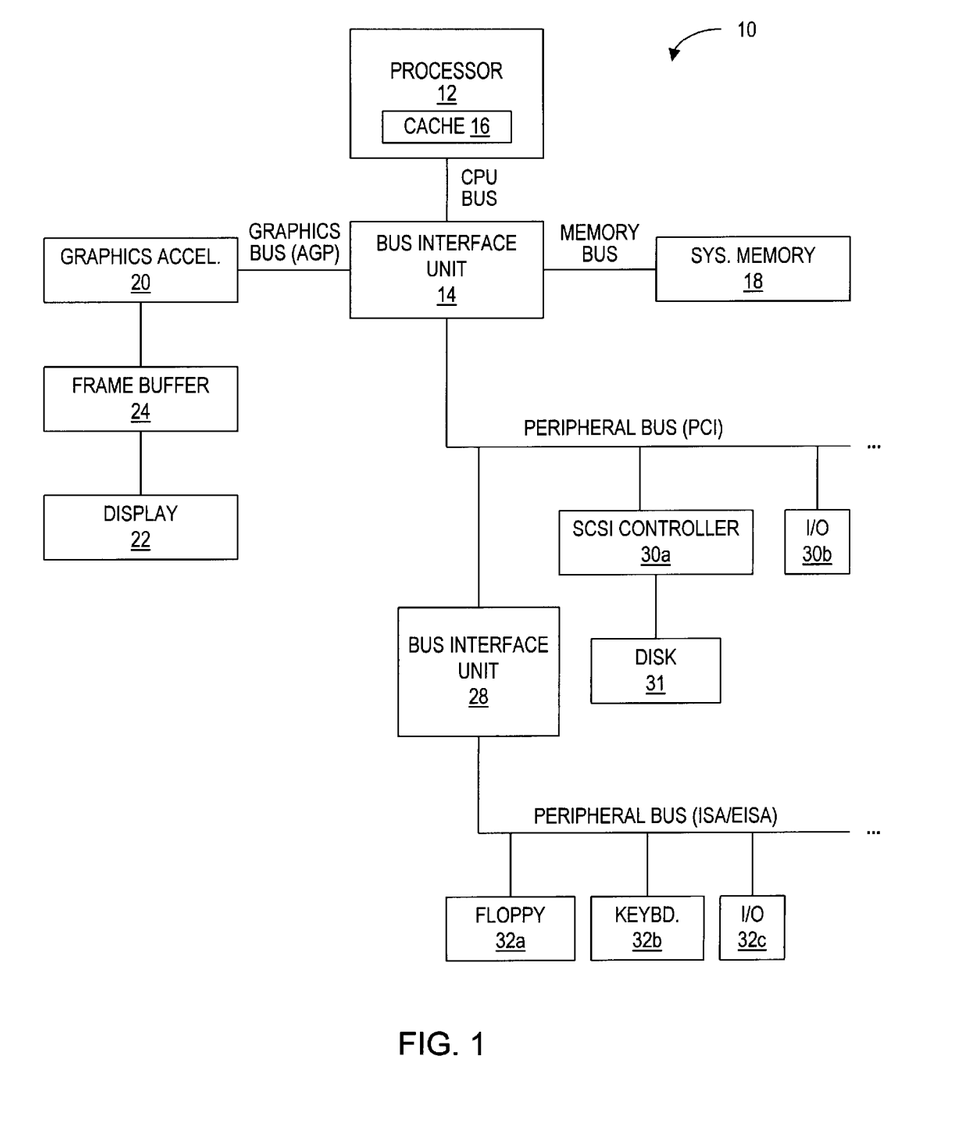
FIG. 1 is a block diagram of a computer system comprising various buses and bus interface units.

Turning now to the drawings, FIG. 1 illustrates a computer 10 having multiple buses, including a CPU bus, a mezzanine or PCI bus, and a peripheral bus or ISA/EISA bus. The CPU bus connects a CPU or processor 12 to a bus interface unit or north bridge 14. A cache memory 16 is preferably embodied within processor 12 and/or linked to processor 12 by the CPU bus. Bus interface unit 14 provides an interface between components clocked at similar rates. Bus interface unit 14 preferably contains a memory controller which allows communication to and from system memory 18. A suitable system memory 18 comprises DRAM or SDRAM. Interface unit 14 may also include a graphics port to allow communication to a graphics accelerator 20. A graphics port, such as AGP, provides a high performance, component level interconnect targeted at three dimensional graphics display applications and is based on performance extensions or enhancements to PCI. AGP interfaces are generally standard in the industry, the description of which is available from Intel Corporation.

Generally speaking, AGP is PCI with expanded protocol suitable for graphics intensive applications, usable for a display device 22 coupled to the graphics port (AGP) by a graphics accelerator and local memory or frame buffer 24. The form and function of a typical graphics accelerator is generally known in the art to render three dimensional data structures which can be effectively shifted into and from system memory 18 to alleviate increased costs of local graphics memory. Frame buffer 24 is generally understood as any buffer which can capture a frame of memory, defined as a still picture. Display 22 is any electronic display upon which an image or text can be presented. A suitable display 22 includes a cathode ray tube ("CRT") a liquid crystal display ("LCD"), etc.

Interface unit 14 is generally considered an application specific chip set or application specific integrated circuit ("ASIC") that provides connectivity to various buses, and integrates other system functions such as memory interface and P1394. Systems memory 18 is considered the main memory and refers to a portion of the addressable memory that the majority of memory accesses target. System memory is accessed via interface unit 14, and is considered the largest continuous memory space of computer 10.

Unlike the CPU bus which runs at speeds comparable to CPU 12, PCI bus generally runs at speeds of, e.g., 33 MHz or lower. Another bus interface unit 28 is coupled between two dissimilar peripheral buses (i.e., the PCI bus and the ISA/EISA bus). Similar to unit 14, unit 28 is an ASIC or group of ASICs that provide connectivity between various buses, and may also include system function which can possibly integrate one or more serial ports. Attributed to the PCI bus are input/output ("I/O") devices 30, one of which can be a SCSI controller link between, for example, a secondary disk drive and the PCI bus. I/O devices 30 generally operate at higher speeds than I/O devices 32, examples of which include a floppy disk drive, a keyboard, etc.

Figure 2:
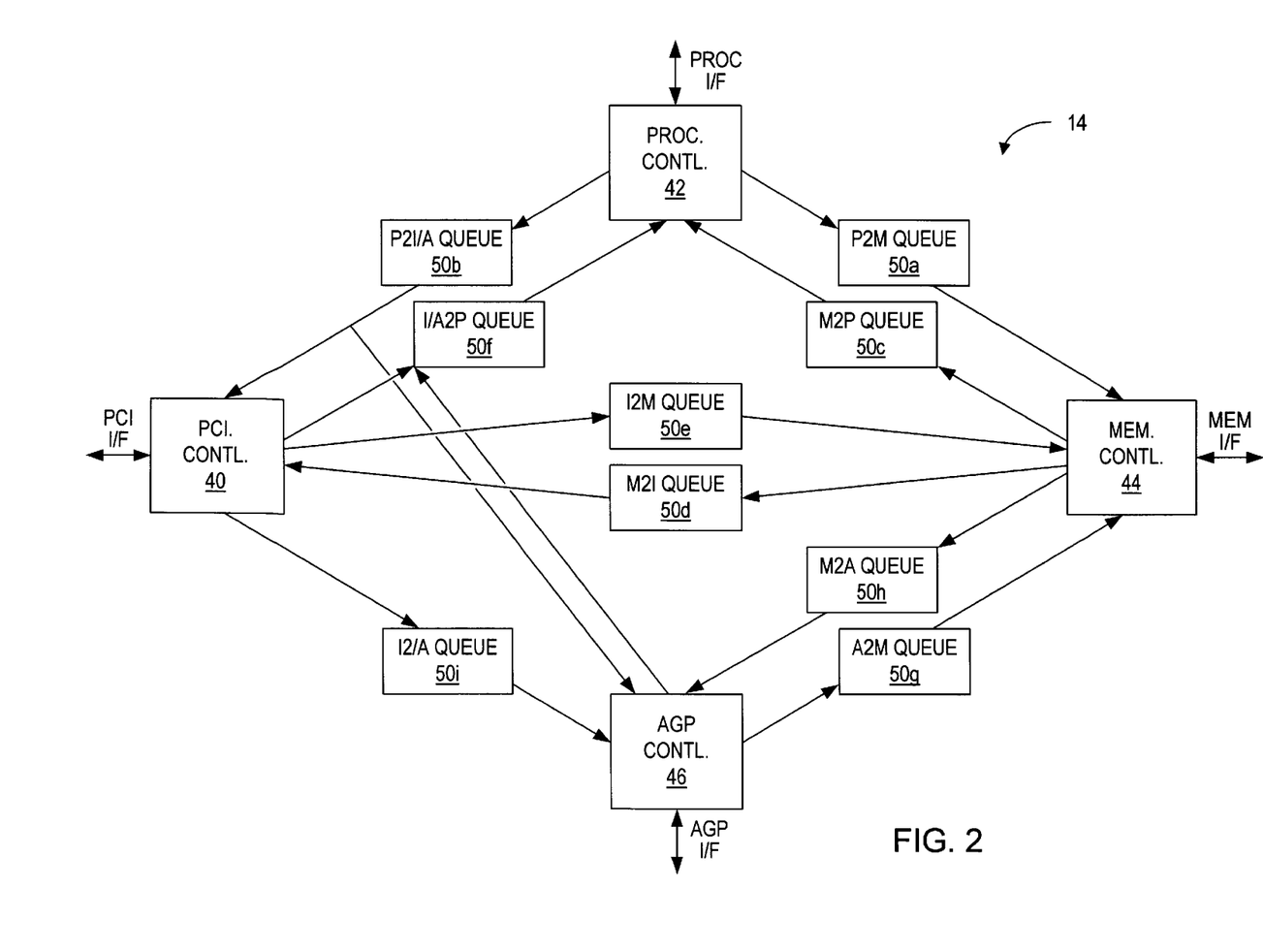
FIG. 2 is a block diagram of a bus interface unit containing address and data queues coupled between a processor, a PCI bus, a graphics bus and a system memory.

Turning to FIG. 2, details regarding bus interface unit 14 are shown. The various sub-components of interface unit 14 can be connected on a monolithic substrate for high end computer applications. Interface unit 14 operates in conjunction with other bus interface units such as interface unit 28, and preferably includes at least four interfaces and multiple address and data queues. Each interface is unique to the specific bus protocol of the bus to which is connects. As shown, the PCI interface ("PCI IF") includes a PCI controller 40 which enables transfer of information (control, address and data) to and from the PCI bus.

Figure 6:
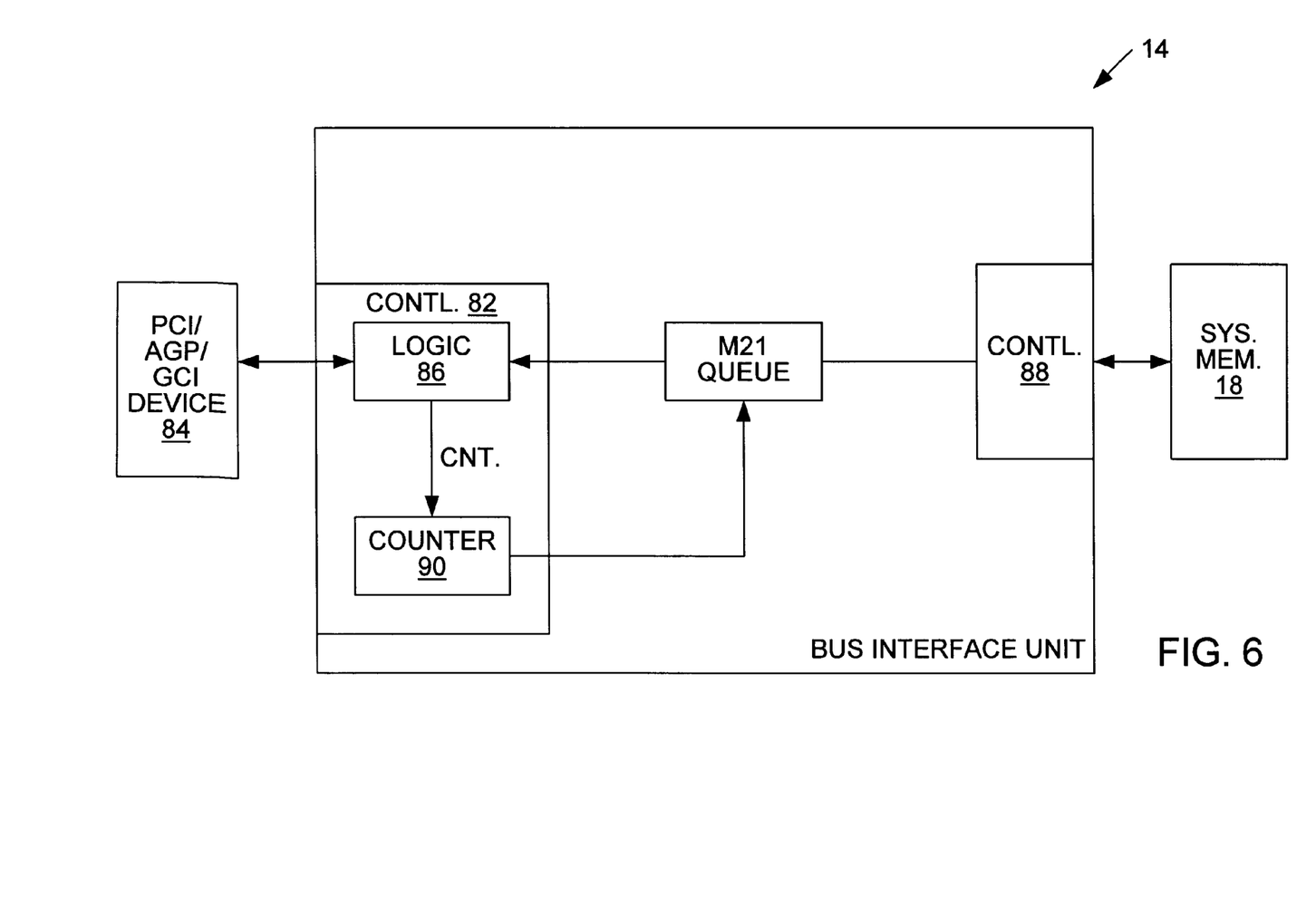
FIG. 6 is a block diagram of the bus interface unit comprising an interface controller which counts an address offset of a pair of bits within an initial address presented from the peripheral device and sets the pair of bits to an address which allows the system memory to dispatch data in sequence by de-queuing data from a queue by an amount equal to the count value.

Attributed to each of the other buses is a respective controller which provides an interface for information sent across the respective bus. Thus, in addition to the PCI controller 40, a processor controller 42, a memory controller 44 and an AGP controller 46 are embodied within interface controller 14, as shown in FIG. 6. In addition to the various controllers, there are multiple address and data queues. Each controller operates independent of the others, and cycles are passed between controllers using queues which link respective controllers. FIG. 2 illustrates nine queues: processor-to-memory queue (P2M queue) 50a, processor-to-PCI/AGP queue (P2I/A queue) 50b, memory-to-processor queue (M2P queue) 50c, memory-to-PCI queue (M2I queue) 50d, PCI-to-memory queue (I2M queue) 50e, PCI/AGP-to-processor queue (I/A2P queue) 50f, AGP-to-memory queue (A2M queue) 50g, memory-to-AGP queue (M2A queue) 50h, and PCI-to-AGP queue I2A queue) 50i. It is recognized, that if needed, an additional graphics interface (i.e., GCI) beyond AGP can be used for graphics intensive applications. Each of the queues 50 shown in FIG. 2 communicate with each other through the various controllers and/or control signals routed directly between respective queues. Separating the major blocks as shown allows for a significant amount of concurrency.

Processor controller 42 controls the CPU interface and the various queues 50 linked to the CPU interface. Processor controller 42 allows the CPU (or processor) to pipeline cycles and allows several cycles to be stored within the processor controller. Additionally, processor controller 42 schedules accesses to cache storage locations within one or more processors.

Memory controller 44 controls possibly multiple banks of SDRAMs, as well as the CS, DQM, RAS, CAS, WE, CKE and address signals sent to those banks. In addition, memory controller 44 generates several control signals to respective queues 50 for memory data bus control. Memory controller 44 arbitrates among processor writes, processor reads, PCI writes, PCI reads, refresh, AGP reads and AGP writes. Arbitration for each cycle is pipelined into the current memory cycle which ensures that the next memory address is available on the memory bus before the current cycle is complete. This results in minimum delay, if any, between memory cycles. Memory controller 44 is capable of reading ahead on PCI master reads and will do so if the PCI master issues a read multiple command. Interface unit 14 can then continue providing data to the PCI master at a high rate.

PCI controller 40 ensures compatible interface to the PCI bus protocol. When the processor accesses the PCI bus, PCI controller 40 operates as a PCI master. When a PCI master, (e.g., PCI I/O device) accesses memory, PCI controller 40 acts as a PCI slave. Processor-to-PCI cycles are buffered in queue 50b and then presented to controller 40. Controller 40 must determine when this queue needs to be emptied before running in a slave mode.

Processor controller 42 can be thought of as any device responsible for decoding processor cycles, running snoops to the processor cache storage locations, and providing miscellaneous logic such as soft reset. Functionality of a processor controller used in the bus interface unit is generally well known as any unit which accepts cycles from the CPU bus and then parses them out to the appropriate controllers 40, 44, 46 and/or queues 50. It is recognized that the processor controller consists of a number of sub-modules that can be grouped into various logic subsystems such as a processor bus tracker/queue cycle manager, a processor bus master state machine, snoop control, etc. Similar to processor controller 42, the PCI controller 40 or the AGP controller 46 is also well known as containing a series of state machines which control the PCI/AGP interface. Data passing through the PCI controller 40 is preferably broken into three basic sub-modules: PCI master interface, PCI target (slave) interface and PCI glue logic. PCI controller 40 communicates with memory controller 44, processor controller 42 and queues 50 through various control signals internal to interface unit 14. AGP controller 46 interfaces externally to a 66 MHz, 32 bit AGP/PCI bus and interfaces internally to controllers and queues. Memory controller 44 supports AGP master reads and writes to the system memory using AGP or PCI protocol. Processor controller 42 initiates PCI protocol reads and writes to the AGP master frame buffer and registers. The various queues 50 provide data flow buffers between interfaces.

The various queues 50 can be classified as address and data queues or merely data queues depending on the flow direction of information and the controllers being linked by the respective queues. The following Table I represents a list of the various data and address queues 50, their size, and the data/address flow of each queue:

TABLE I

| Queue Name | Data/Address | No. Locations | Source | Destination |
|---|---|---|---|---|
| P2M(A) | Address | 4 slots | processor | memory |
| P2M(D) | Data | 4 cache lines | processor | memory |
| P2I(A) | Address | 8 slots | processor | PCI or GCI |
| P2I(D) | Data | 8 quad words | processor | PCI or GCI |
| M2P | Data | 2 cache lines | memory | processor |
| I2P | Data | 2 cache lines | PCI or GCI | processor |
| I2M(A) | Address | 4 slots | PCI | memory |
| I2M(D) | data | 4 cache lines | PCI | memory |
| M2I | Data | 2 cache lines | memory | PCI |
| M2A | Data | 8 cache lines | memory | AGP |
| A2M(D) | Data | 8 cache lines | GCI or AGP | memory |
| A2M(A) | Address | 8 slots | GCI or AGP | memory |

It is recognized that numerous other queues can be employed. For example, Table I could include queues to another graphics bus, such as a GCI-type bus. It is also recognized that for a PCI or AGP peripheral device to write to memory, the respective I2M queue and A2M queue transfer both address and data information before presenting that information to the memory controller 44. Information sent from PCI controller 40 (or AGP controller 46) to processor controller 42 is buffered merely as data within the I/A2P queue 50f, and information sent from the processor controller 42 to memory controller 44 is buffered as address and data within the P2M queue 50a.

Figure 3:
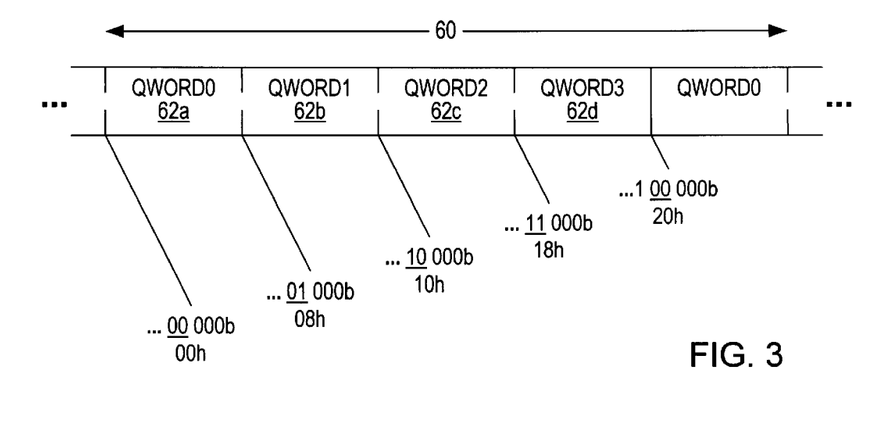
FIG. 3 is a diagram of a cache line and addresses (binary and hexadecimal) used to fetch data from quad word partitions within the cache line, according to one embodiment.

FIG. 3 illustrates a cache line 60 within a sequence of cache lines stored within system memory. Cache line 60 may contain several words or quad words ("qword0", "qword1", "qword2" and "qword3" labeled with numeral 62). In the example illustrated, four quad words 62 comprise cache line 60, wherein each quad word contains four words, or 8 bytes. Accordingly, a 64-bit memory bus can accommodate transfer of one quad word during a single cycle. Quad words 62 are addressed by a 32-bit address line. The least significant five bits are used to address the 32 bytes within cache line 60. Shown in FIG. 3 are the least significant five bits in both binary and hexadecimal form. The least significant three bits are used to address bytes within a specific quad word; however, the least significant fourth and fifth bits (shown with an underline) discern which quad word is to be addressed within cache line 60. For example, the least significant five bits ranging between 00000 and 00111 addresses bytes within quad word 62a. Binary bits 01000 through 01111 addresses bytes within quad word 62b, and so forth for the entire cache line 60.

Figure 4:
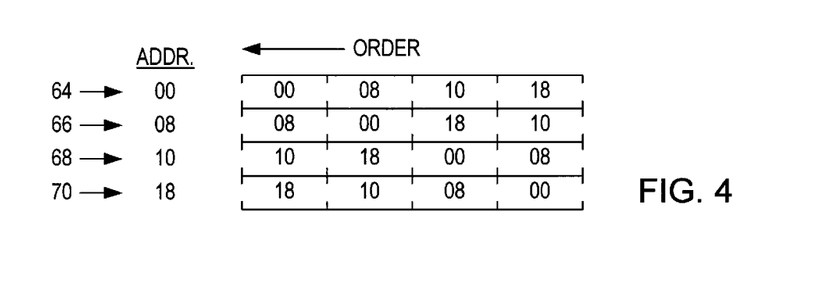
FIG. 4 is a diagram of the order in which quad word partitions are transferred from cache lines within the system memory to a processor according to a toggle mode addressing scheme.

A read operation involves transfer of one or more quad words across the 64-bit memory bus to the read requester. To complete transfer of an entire cache line, all four quad words must be addressed and sent in a specific order. FIG. 4 illustrates a toggle mode addressing scheme and the order by which quad words are sent to, for example, the CPU. As shown in line 64, a 00 target address sent from a peripheral device will draw quad words beginning with address 00, then address 08, then address 10, and finally address 18. This is represented as a sequential addressing or wrap mode addressing scheme. However, as shown in line 66, if the target address requested by the peripheral device is 08, then the second quad word will be drawn before the first quad word, and the fourth quad word will be drawn before the third quad word, (i.e., the ordered read sequence is shown as 08 first, followed by 00, followed by 18, and then 10). Line 68 illustrates the order at which quad words are drawn if the target address is 10, and line 70 illustrates the order at which quad words are drawn if the target address is 18. In all instances except for line 64, quad words are drawn out-of-address order. Specifically, quad words having a larger address are dispatched from system memory before those having a smaller address. Only line 64 orders data read in a numerically increasing address sequence.

Figure 5:
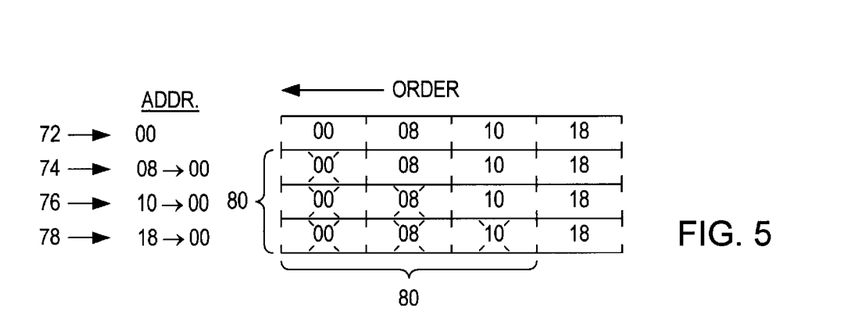
FIG. 5 is a diagram of the order in which quad word partitions are transferred from cache lines within the system memory to a peripheral device according to a sequentially increasing address achieved by rearranging address bits presented to the system memory.

FIG. 5 illustrates the present intent by which addresses are reordered or modified if the target address is not 00. A combination of FIGS. 3 and 5 illustrate, in the first line 72, a target address 00 being maintained to allow normal sequential ordering of quad words from system memory. However, line 74 indicates modification of target address 08 to an initial address 00 to ensure the ordered sequence of data being sent from system memory is the same as the order shown by line 72. Lines 76 and 78 also indicate modification of the target address 10 and 18, respectively, to 00 also maintain sequentially increasing addresses and drawing of quad words beginning with qword0, then qword1, then qword2, and finally qword3. It is noted that if the target address is modified, the offset between the target address and the modified address (i.e., initial address) indicates the number of quad words which are to be de-queued one quad word at a time starting when the request and initial address are presented to the memory controller/arbiter. Line 74 indicates discarding the first quad word, while line 76 and 78 illustrate discarding two and three quad words, respectively, as shown by reference numeral 80.

FIG. 6 illustrates specific components used to carry out a read operation. Bus interface unit 14 includes an interface controller, generically referenced as numeral 82. Interface controller 82 is coupled between a peripheral bus and various queues within bus interface unit 14. The peripheral bus can be any bus other than the local CPU bus, and therefore includes a bus which is configured to receive data in successive address order. Various output devices coupled to the peripheral bus include, for example, a PCI output device and/or a graphics output device 84. Output device 84 obtains mastership of the peripheral bus and initiates a read cycle to interface controller 82. Controller 82 responds by receiving a target address from output device 84. Interface controller 82 includes logic 86 which modifies the fourth and fifth least significant bit of that target address to a 00 pattern.

The resulting pattern from logic 86 is then forwarded as an initial address to memory controller 88. Addresses sent subsequent to the initial address are not modified by logic 86. Only the first (or target) address is modified if the fourth and fifth least significant bits are dissimilar from 00. This allows queue 50d to store data in successive order, beginning with the first address of a quad word within a targeted cache line and ending with the last quad word within that cache line. Logic 86 can then dispatch in successive order, addresses of the targeted cache line to memory controller 88. Controller 88 responds by drawing quad words in successive order from system memory 90. The order at which quad words are addressed is shown in FIG. 5 as line items 72–78, regardless of where in that order the targeted address occurs.

Modifying the targeted address to an initial address of a successive order of addresses used for a particular cache line requires that the amount of modification be kept track of. Specifically, logic 86 forwards a count value to counter 90. That count value represents the offset between the target address and the initial address. Counter 90 can then assert the de-queued signal to queue 50d corresponding to the number of clocks equal to the offset number. Knowing the count value, or applying the count value to the data within queue 50d allows queue 50d to de-queue (or discard) quad words of data prior to the target addressed quad word. In this fashion, the first quad word sent to interface controller 82, and eventually to output device 84, is in fact the quad word corresponding to the target address. Importantly, successive address quad words arrive in sequential order after the targeted quad word. This affords output device 84 to receive data bursts in address sequential order.

Figure 7:
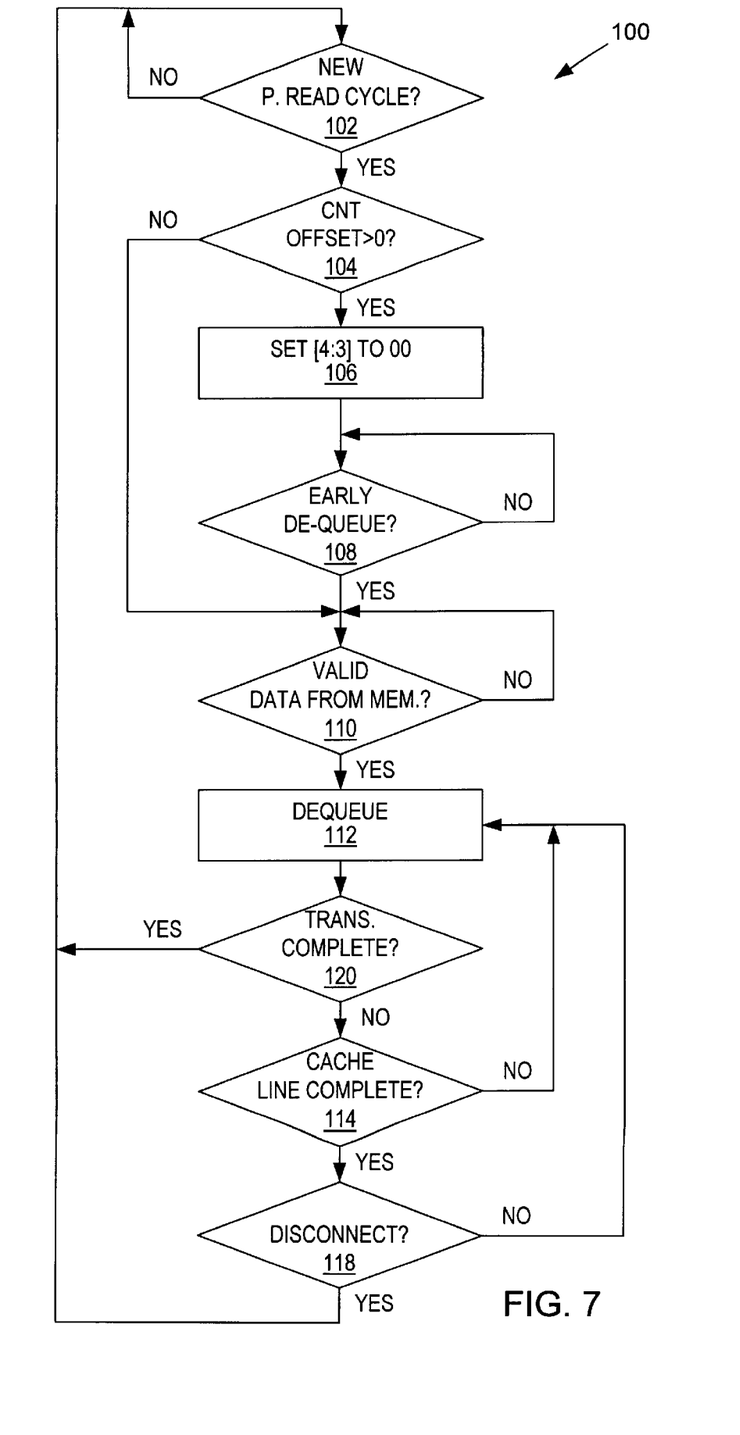
FIG. 7 is a flow diagram of steps involved in a peripheral device reading from the system memory sequentially addressed data within an initial cache line and subsequent cache lines.

FIG. 7 is a flow diagram 100 of steps involved in a peripheral device read operation from system memory. First, a new read cycle attributed to a new read transaction from a peripheral device must be decoded. If a read request is detected, an address is then forwarded to the interface controller which then counts an offset between bits four and five of that address only if a count offset occurs 104. The target address (first address sent from the output device) is the only address in which an offset is denoted, and is the only address having the fourth and fifth bits (i.e., binary bits 4:3) set to 0:0 at step 106.

Before the data is sent back from system memory locations, it is de-queued an amount equal to the count offset value 108. Once the valid data has been placed in the queue from memory 110, then all subsequent quad words can be de-queued, in normal fashion since all subsequent addresses are bound at cache line boundaries 114 and therefore must occur in sequential order. Thereafter, a new cache line can be transferred in sequential order beginning with the first quad word in an address sequence of quad words since it naturally follows that the first address of bits 4:5 in that successive cache line is address 00. Successive cache line are transferred until a disconnect occurs 118. Disconnect always occurs at cache line boundaries since entire cache lines of quad words are sent from the system memory.

Disconnect occurs if a disconnect signal is sent from the interface slave controller to the output device master controller. Once disconnect occurs, the cache line transferal is terminated at a cache line boundary. It is not until the peripheral transfer is complete 120, or a disconnect 118 occurs will it then be necessary to determine if the next successive read cycle is offset from the first address location of the targeted cache line. Accordingly, once the peripheral transfer is complete 120 or a disconnect 118 occurs, the next read cycle 102 must determine if the targeted address requires modification to an initial address with the fourth and fifth bits set to 00.

It will be appreciated to those skilled in the art having the benefit of this disclosure that this invention is believed to be capable of performing high speed read operations to a peripheral device linked upon the PCI bus or a graphics bus. Various modifications and changes may be made as would be obvious to a person skilled in the art having the benefit of this disclosure. It is intended that the following claims be interpreted to embrace all such modifications and changes and, accordingly, the specification and drawings are to be regarded in an illustrative rather than a restrictive sense.

What is claimed is:

1. A computer, comprising:
   a memory adapted to store a plurality of quad words arranged within a cache line;
   an output device adapted to initially read a target quad word within the cache line during a read cycle; and
   a bus interface unit coupled between an output device and the memory for fetching the plurality of quad words in a successive address order and discarding all quad words addressed prior to the target quad word.

2. The computer as recited in claim 1, wherein the output device is coupled to a peripheral component interconnect (PCI) bus.

3. The computer as recited in claim 1, wherein said output device comprises an electronic display linked to the bus interface unit by a graphics bus.

4. The computer as recited in claim 3, wherein said graphics bus comprises an advanced graphics port (AGP).

5. The computer as recited in claim 1, wherein the plurality of quad words are addressed beginning with a smallest address and ending with a largest address within the successive address order.

6. The computer as recited in claim 1, wherein said bus interface unit further comprises an interface controller coupled to the output device (i) for receiving a target address from the output device, (ii) for modifying the target address to an address corresponding to the smallest address within the successive address order, and (iii) for determining an offset value between the smallest address and the target address.

7. The computer as recited in claim 6, wherein said bus interface unit further comprises a data queue coupled between the memory and the interface controller, and wherein an order by which the plurality of quad words are loaded into the data queue is controlled by first loading the plurality of quad words with the smallest address and lastly with the largest address.

8. The computer as recited in claim 7, wherein the number quad words discarded from the data queue prior to being sent to the interface controller is substantially equal to the offset value.

9. A computer, comprising:
   a peripheral bus upon which an output device is coupled;
   a memory adapted to store a plurality of quad words arranged within a cache line;
   a bus interface unit coupled between the peripheral bus and the memory, wherein the bus interface unit includes:
      an interface controller connected to the peripheral bus for receiving a target address corresponding to one of the plurality of quad words, and wherein the interface controller includes logic for modifying the target address to an initial address within a sequential order of addresses used to first select an initial quad word within the cache line; and
      a data queue coupled to receive the initial quad word and discard the initial quad word and any quad words within the plurality of quad words sent to the peripheral bus prior to the quad word addressed by the target address.

10. The computer as recited in claim 9, wherein the peripheral bus is a peripheral component interconnect (PCI) bus.

11. The computer as recited in claim 9, wherein said output device comprises an electronic display linked to the bus interface unit by a graphics bus.

12. The computer as recited in claim 11, wherein said graphics bus comprises an advanced graphics port (AGP).

13. The computer as recited in claim 9, wherein the interface controller comprises a counter coupled to produce a count value corresponding to a differential number of addresses between the initial address and the target address.

14. The computer as recited in claim 13, wherein quad words within the plurality of quad words stored within the data queue are discarded according to the count value.

15. A method for reading quad words within a memory:
   presenting a target address from an output device to the memory;
   reordering the target address to an initial address within a sequence of addresses used to access a cache line within the memory;
   presenting the cache line to a queue beginning with a quad word addressed by the initial address;
   inhibiting quad words within the cache line occurring prior to the target address from being sent from the queue to the output device;
   de-queuing the queue one quad word at a time until the cache line is removed from the queue; and
   de-queuing subsequent cache lines according to an increasing sequential order of addresses used to select quad words within each of the subsequent cache lines.

16. The method as recited in claim 15, wherein the target address is an address which occurs after the initial address within a sequence of addresses.

17. The method as recited in claim 15, wherein the de-queuing subsequent cache lines occurs throughout the entire subsequent cache line in sequential address order.

18. The method as recited in claim 15, wherein the reordering comprises changing a pair of bits within the target address which designate differences in quad words being addressed.

* * * * *